G. H. Timmerman,
Governor Valve.

N° 28,116 — Patented May 1, 1860.

Witnesses:

Inventor:
G. H. Timmerman

UNITED STATES PATENT OFFICE.

G. H. TIMMERMAN, OF ST. LOUIS, MISSOURI.

GOVERNOR-VALVE.

Specification of Letters Patent No. 28,116, dated May 1, 1860.

*To all whom it may concern:*

Be it known that I, G. H. TIMMERMAN, of St. Louis, in the county of St. Louis and State of Missouri, have invented a new and useful Improvement in Governor - Valves; and I do hereby declare that the following is a full, clear, and exact description of the same, reference being had to the accompanying drawings, forming a part of this specification, in which—

Figure 1, is a central vertical section through the governor valve. Figs. 2 and 3, are similar sections representing modified arrangements of the same. Fig. 4, is a horizontal cross section through the governor valve.

Similar letters of reference, in each of the several figures, indicate corresponding parts.

The nature of my invention consists 1st, in a double plunger balanced valve which has its plungers made tapering or the cylindrical seats of the same made flaring at top, substantially as hereinafter set forth.

It consists 2nd, in combining a hand lever with a screw through which the valve rod plays, and with a clamp screw by means of which the sleeve can be clamped to the valve rod whenever it is desired to work the plunger valves by hand.

To enable others skilled in the art, to make and use my invention, I will proceed to describe its construction and operation.

$a$, is the pipe leading to the boiler and $b$, the pipe leading to the steam chest of the engine.

$c$, is a cylindrical box, in the center of which is arranged the valve cylinder $e$. The pipe $a$, opens into the valve cylinder. The seats $t$, $u$, of the two plunger valves $j$, $j$, are arranged in the top and bottom of the valve cylinder $e$, and are made with flaring enlargements on top as seen at $a$, $u$. The diameter of the valve cylinder is somewhat larger than the diameter of the seats. The two plunger valves $j$, $j$, are arranged upon a stem $h$, which is provided with wings $i$, for the purpose of guiding the plunger valves when they ride above their seats. The valve rod $k$, passes through a stuffing box $g$, in the top plate $f$, of the box $c$, and is fastened to the governor $q$, by means of a screw nut $p$. The valve rod $k$, plays through a sleeve $n, r, s$, arranged between the stuffing box $g$, and the screw nut $p$. A clamp screw $o$, screws through the upper flange $r$, of the sleeve and serves to clamp the sleeve to the valve rod for the purpose to be described hereafter. A hand lever $m$, pivoted to a standard $l$, extending from the top plate $f$, of box $c$, fits into the neck $n$, of the sleeve, between the flanges $r$, $s$.

Whenever it is desired to operate the plunger valves by means of the hand lever, the valve rod $k$, is disconnected from the governor by unscrewing the nut $p$, and the sleeve $n$, $r$, $s$, is fastened to the valve rod by screwing down the clamp rod $o$, when the plunger valves can be raised and lowered by operating the hand lever $m$. As the steam enters through pipe $a$, into the cylinder $e$, between the two valves and as the surfaces of the two valves are equal, it will be seen that the valves are balanced. As the action of the governor or hand the lever raises the plunger valves above their seats, the steam entering as indicated by arrows 1, escapes through the flaring openings $w$, $v$, underneath each of the valves, into the box $c$, as indicated by arrows 2 and 3. The steam passing down through space $d$, around the valve cylinder into pipe $b$, (see arrows 4) mingles here with the steam which passes underneath the lower valve, as indicated by arrows 2.

The upper portions of the valve seats are made with flaring enlargements in order to graduate the escape of the steam as the valves rise, and to prevent the valves from striking and catching against the edge of the seats, while moving downward.

Figure 1:
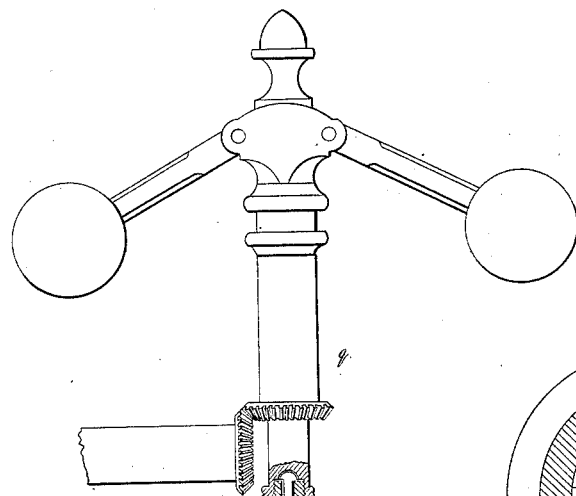
Fig. 1, represents the distance between the two plunger valves as being somewhat less than the distance between the two seats. By this means the lower valve is made to rise above its seat before the upper valve, for the purpose of admitting only little steam at the commencement of the rise of the valves.
Figure 4:
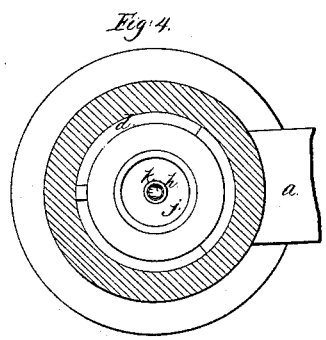
Figure 2:
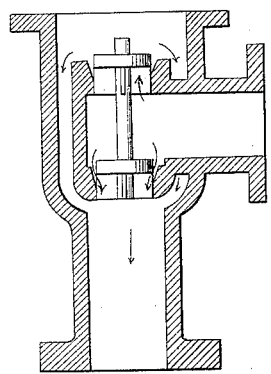
Fig. 2, represents a modified arrangement, the distance of the valves being equal to the distance of the seats.
Figure 3:
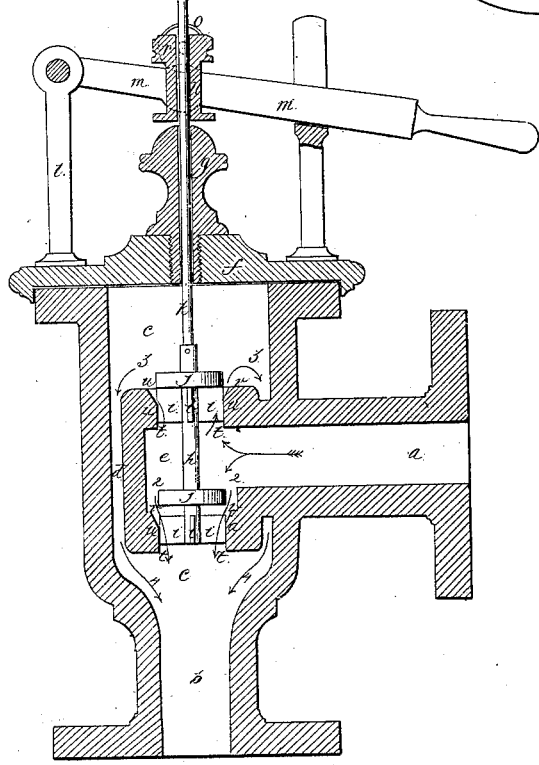
Fig. 3, represents another modification, the valve seats being altogether cylindrical without any flaring enlargements.

As a further modification of my invention, I propose to make the seats of the plungers with parallel sides which extend from top to bottom, and to give the plungers a taper form, as represented at $y$, $y$, Fig. 3, in red color. This construction it is obvious will provide for a gradual escape of the steam in the same manner that the flare at the top of the seats does.

What I claim as my invention and desire to secure by Letters Patent, is—

1. A double plunger balanced valve which has its plungers made tapering or the cylindrical seats of the same made flaring at top, substantially as and for the purposes set forth.

2. Combining a hand-lever *m*, with a sleeve *n*, through which the valve rod *k*, plays, and with a clamp screw *o*, by means of which the sleeve can be clamped to the valve rod, whenever it is desired by detaching the governor by means of the screw nut *p* to work the plunger valves by hand, substantially as and for the purposes set forth.

G. H. TIMMERMAN.

Witnesses:
GOODWIN Y. ATLEE,
R. W. FENWICK.